United States Patent
Taneja et al.

(10) Patent No.: US 11,277,467 B1
(45) Date of Patent: Mar. 15, 2022

(54) METHOD, SYSTEM, AND PRODUCT FOR ORCHESTRATING UPLOADS OF VERY LARGE DESIGN FILES TO SELECTED CLOUD PROVIDERS IN A MULTI-CLOUD ARRANGEMENT

(71) Applicant: Cadence Design Systems, Inc., San Jose, CA (US)

(72) Inventors: Ashok Taneja, Fremont, CA (US); Yateesh Chandraiah, San Jose, CA (US); Tarak N. Ray, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 164 days.

(21) Appl. No.: 16/587,054

(22) Filed: Sep. 30, 2019

(51) Int. Cl.
| | |
|---|---|
| *G06F 16/11* | (2019.01) |
| *H04L 67/06* | (2022.01) |
| *H04L 67/01* | (2022.01) |
| *H04L 9/08* | (2006.01) |
| *H04L 67/025* | (2022.01) |
| *H04L 67/1097* | (2022.01) |

(52) U.S. Cl.
CPC .......... *H04L 67/06* (2013.01); *H04L 9/0822* (2013.01); *H04L 67/025* (2013.01); *H04L 67/1097* (2013.01); *H04L 67/42* (2013.01)

(58) Field of Classification Search
CPC ..... H04L 67/06; H04L 67/025; H04L 9/0822; H04L 67/1097; H04L 67/42
USPC .......................................................... 709/219
See application file for complete search history.

(56) References Cited

U.S. PATENT DOCUMENTS

| | | | | |
|---|---|---|---|---|
| 2013/0152047 | A1* | 6/2013 | Moorthi | G06F 11/368 717/124 |
| 2014/0164449 | A1* | 6/2014 | Kim | G06F 16/188 707/827 |
| 2015/0067086 | A1* | 3/2015 | Adriaens | G06F 15/17331 709/212 |
| 2017/0048021 | A1* | 2/2017 | Yanovsky | H04L 63/1458 |

* cited by examiner

*Primary Examiner* — Tu T Nguyen
(74) *Attorney, Agent, or Firm* — Vista IP Law Group, LLP

(57) ABSTRACT

An approach is described for a method, system, and product, the approaching includes a multi-cloud orchestrator that manages interfacing with multiple cloud service providers on behalf of a user. In some embodiments, the multi-cloud orchestrator includes a client interface layer for each cloud provider supported where each supported cloud provider is associated with a set of management data for tracking transfers and a set of mapping data for scheduling sequences of commands to satisfy user requests. In some embodiments, the process is tightly coupled with an electronic design system and that client side and circuit verification and processing tools in cloud provider provided computing environments.

20 Claims, 13 Drawing Sheets

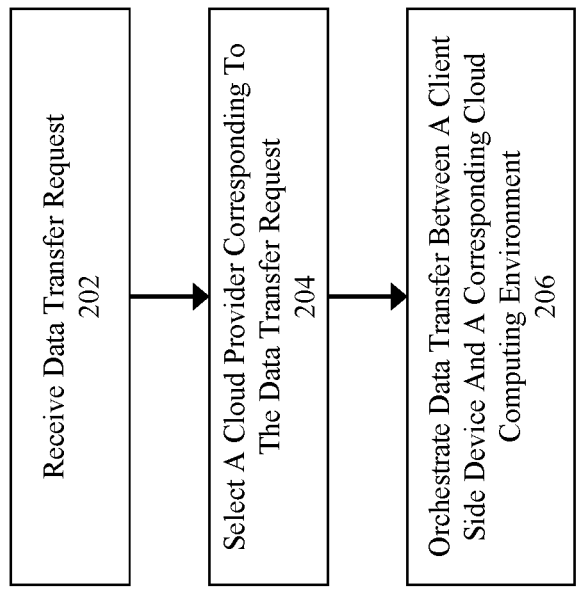

METHOD, SYSTEM, AND PRODUCT FOR ORCHESTRATING UPLOADS OF VERY LARGE DESIGN FILES TO SELECTED CLOUD PROVIDERS IN A MULTI-CLOUD ARRANGEMENT

BACKGROUND

Semiconductor devices are used in a variety of electronic applications, such as personal computers, cell phones, digital cameras, and other electronic equipment. However, engineering semiconductors to achieve higher and higher performance results in designs that have grown ever more complicated. This complication results in ever increasing design file sizes. In addition, with the advent of cloud service providers, designers and engineers have the potential to increase productivity by leveraging external processing resources from cloud service providers.

However, use of external processing resources presents some issues particular to cloud environments. For example, design data needs to be transferred to cloud service provider resources before the design data can be operated upon, but providing this design data to an external source also presents a security concern.

Transferring design files can be very time consuming. For instance, a 1 TB design file of may take over 24 hours to transfer with current techniques. Additionally, if a transfer fails partway through, then all the time already spent on the transfer may be wasted. Similarly, if a change needs to be made to the design (e.g. because an error is found), then the transfer may need to be restarted wasting even more time.

Security is also a concern for most, if not all, semiconductor device designers. This is because digital data is easily reproducible, but detection/identification of a reproduction in an actual semiconductor is so costly as to be essentially impossible. However, transfers that use standard hypertext transfer protocol secure (HTTPS) require sharing information with a receiver (e.g. cloud provider) that would make the data easily readable.

Additionally, these issues are further exacerbated by the different tools used to interface with different cloud providers and their lack of specific tailoring to the electronic design environment. In particular, current tools merely provide support for transferring files without any features specific to an electronic design environment.

Therefore, what is needed is improve approach for orchestrating uploads of very large design files to selected cloud providers in a multi-cloud arrangement.

SUMMARY

Embodiments of the present invention provide a method, system, and product for orchestrating uploads of very large design files to selected cloud providers in a multi-cloud arrangement.

According to some embodiments, the approach includes a multi-cloud orchestrator that manages interfacing with multiple cloud service providers on behalf of a user. In some embodiments, the multi-cloud orchestrator includes a client interface layer for each cloud provider supported, where each cloud provider is associated with a set of management data for tracking transfers and a set of mapping data for scheduling sequences of commands to satisfy user requests. In some embodiments, the process is tightly coupled with an electronic design system at the client side and circuit verification and processing tools in cloud provider provided computing environments.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIGS. 2A-2B illustrates a flow for orchestrating uploads of very large design files to selected cloud providers in a multi-cloud arrangement according to some embodiments.

DETAILED DESCRIPTION

Embodiments of the present invention provide a method, system, and product for orchestrating uploads of very large design files to selected cloud providers in a multi-cloud arrangement.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated.

In some embodiments, the approach includes receiving a design file transfer request from a client device associated with an electronic design system, selecting a cloud provider corresponding to the design file transfer request, and orchestrating the design file transfer request from client storage to a cloud computing environment provided by the cloud provider. For example, a user request to transfer a design file results in the selection of a corresponding cloud provider, and orchestration of a transfer from the client side to the cloud side in order to allow for circuit verification and processing tools in the cloud provided computing environment to analyze a design file transferred from the client side.

Figure 1:
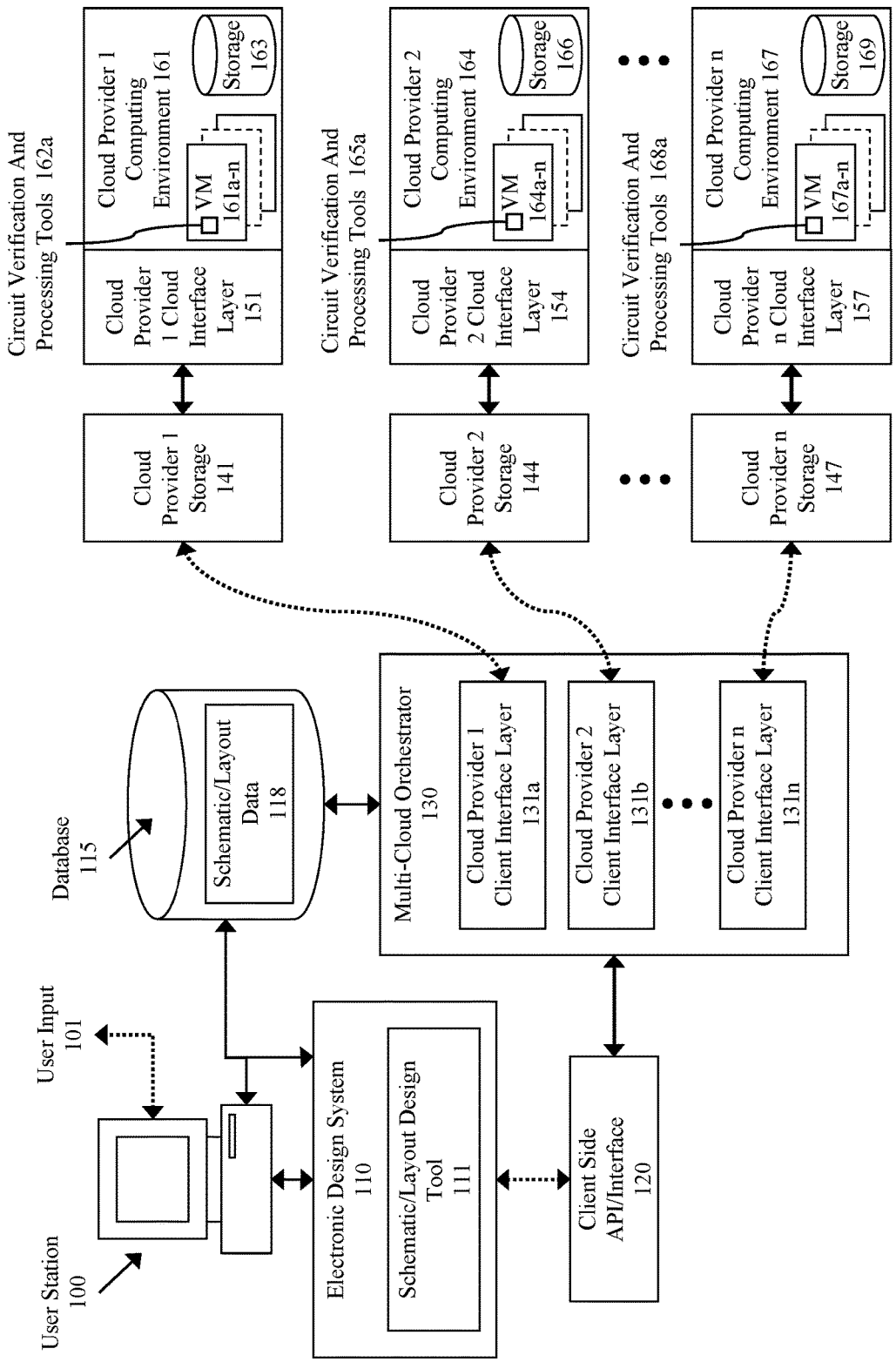
FIG. 1 illustrates an example system for orchestrating uploads of very large design files to selected cloud providers in a multi-cloud arrangement according to some embodiments.

FIG. 1 illustrates an example system for orchestrating uploads of very large design files to selected cloud providers in a multi-cloud arrangement according to some embodiments. Generally, the process includes a client side multi-cloud orchestration process that includes client interface layers for managing the preparation and transfer of data between a client-side interface layer and respective cloud providers at cloud provider storage locations.

A user station 110 includes or provides access to an electronic design system 110. For instance, the electronic design system 110 might be located on the user station 100, on a remote device accessed by the user station, or distributed across multiple devices. The user station 100 causes the execution of instructions for efficiently routing following a free form contour according to some embodiments as disclosed herein. The user station 100 comprises any type of computing station that is useable to operate or interface with the database 115. Examples of such user stations include workstations, personal computers, or remote computing terminals. In some embodiments, the user station 100 comprises a display device, such as a display monitor, for displaying a user interface to users at the user station. The user station 100 also comprises one or more input devices for the user to provide operational control over the user station, such as a mouse or keyboard to manipulate a pointing object in a graphical user interface from which a user input 101 might be received. In some embodiments, the graphical user interface includes tools for controlling/selecting a design file for transfer, a destination where the design file is to be transferred, and an action to be completed at that destination. In some embodiments, the interface also provides for simple user requests to be to interact with cloud providers. For instance, a user might request a list operation (list the files or file portions at the cloud service provider), a get operation (to get a file or file portion from the cloud service provider), a put operation (to put a file or file portion on storage at a cloud service provider), a delete operation (to remove a file or file portion from a cloud service provider storage location), and a config operation (to configure any of the parameters/settings discussed herein).

The electronic design system 110, as illustrated, includes a schematic/layout design tool 111. In some embodiments, the various components, or the functions, of the electronic design system 150 are combined or separated into different components from those illustrated. For example, a separate layout design tool including both a layout creation component and a layout verification component and schematic design tool including both a layout creation component and a layout verification component could be provided at the electronic design system 110. In some embodiments, the various functions of the tool could be provided at different locations. For instance, creation components (e.g. schematic/layout) could be provided at the electronic design system 110, while verification components (e.g. schematic/layout) could be provided at the cloud provider computing environment 161, 164, or 167.

The schematic/layout design tool 111, comprises a tool for creating and or modifying a schematic/layout of a circuit design. For instance, schematic/layout design tools are generally known in the art and comprise different components for different types of design activities. For instance, one circuit design component might comprise an interface for accepting a hardware description or portion thereof as described by a hardware design language (e.g. Verilog, VHDL, etc.). Another circuit design component might comprise a circuit design component for manually manipulating/creating a circuit design using a circuit schematic. A layout design component might comprise a layout editor for modifying/creating layers of a design as they would be constructed on a semiconductor substrate or printed circuit board. Generally, the circuit/layout design tool 111 operates on schematic/layout data (e.g. circuit/layout data stored in database 115) and can be used to generate a circuit schematic/layout used in semiconductor/electronics manufacturing. In some embodiments, the schematic/layout design tool 111 and/or the electronic design system 110 is modified to include an interface (client-side API/Interface 120) to control/access the multi-cloud orchestrator 130. The multi-cloud orchestrator 130 will be described further below. Briefly, the multi-cloud orchestrator 130 uses data for mapping information received from the client-side API/interface 120 to a corresponding cloud provider and computing environment and in some embodiments mapping status information back to the electronic design system 110.

The system includes a database 115 which is illustrated as including schematic/layout data 118. In some embodiments, the database 115 comprises a single database with one or more subsets within that database for the circuit data and the layout data (e.g. circuit/layout data 118) as illustrated in FIG. 1. However, in some embodiments the database comprises multiple separate databases on different computing systems and/or in different locations connected via electronic communication links (e.g. wired and/or wireless networks). The system may further include database access modules for accessing and storing the data, whether stored at a single database or at multiple databases.

The schematic/layout data 118 comprises any types of representations of a circuit design. For instance, the design data comprises any one or more of a hardware descriptive language design, a circuit schematic design, a circuit layout, or any combination thereof. The circuit/layout data 118 corresponds to at least layout data.

In some embodiments, a client-side API/Interface 120 is located between the electronic design system 110 and the multi-cloud orchestrator 130. Alternatively, the client-side API/Interface 120 may be located in the electronic design system the multi-cloud orchestrator. Regardless of the specific location the client-side API/Interface 120 enables the electronic design system and the multi-cloud orchestrator 130 to exchange relevant communications.

The multi-cloud orchestrator 130 multiple cloud provider client interface layers 131a-n. These cloud provider client interface layers 131a-n each correspond to supported cloud providers that the multi-cloud orchestrator 130 can facility exchanges of large design files and associated communications. For instance, each cloud provider client interface layer may comprise a mapping layer to assist in translating requests/instructions from the client-side API/Interface 120 to one or more instructions/requests/exchanges between the multi-cloud orchestrator 130. There may be any number of reasons that one cloud provider might be selected by a user over another cloud provider—e.g. because of a preexisting relationship/contract, because of latency of communications, because of transfer speeds, availability, reliability, privacy/security, government regulation, price, processing power that can be used, etc. Thus, the multi-cloud orchestrator 130, disclosed herein, provides various interface layers for supporting multiple different cloud providers. The multi-cloud orchestrator 130 will be discussed further below. The multi-cloud orchestrator 130 may be embodied as a client side service/device (e.g. a client side service executing on a client side device attached to a local network of the client), a middleware (e.g. provided by a, electronic design system vendor to connect to a electronic design system vendor public cloud or third party cloud public), or a cloud environment (e.g. public or private cloud).

FIG. 1 also includes an illustration of cloud provider systems. For instance, cloud providers might include cloud storage 141, 144, 147 that is provided to the public based on a service agreement. The cloud storage 141, 144, 147 might be used by the multi-cloud orchestrator 130 for staging design files before they are moved into a corresponding cloud provider computing environment (see 161, 164, and 167) by e.g. the cloud provider interface layer (see 151, 154, and 157). In some embodiments, the cloud provider interface layers 151, 154, 157 comprise a multi-cloud orchestrator or a portion thereof for interfacing with a client-side multi-cloud orchestrator 130. Regardless, each of the cloud computing environments might comprise one or more virtual machines (VMs) 161a-n, 164a-n, and 167a-n, and where the data staged at the corresponding cloud provider storage 141, 144, and 147, can be moved into the cloud environment at 163, 166, and 169 and made available to the virtual machines in the computing environment.

In some embodiments, each cloud provider computing environment comprises one or more circuit verification and/or processing tools 162a, 165a, 168a. These circuit verification and processing tools can operate on the data that the multi-cloud orchestrator moves into the environment such as to perform design rule checking and verification for a design schematic, a layout, or as part of generating/validating a final tape out. In some embodiments, the circuit verification and processing tools can operate on portions of the design as they are received. Furthermore, in some embodiments, if the circuit verification and processing tools determine that an error should be generated, they may trigger through the corresponding cloud provider interface layer a notification to the multi-cloud orchestrator, the electronic design system 110, and/or the user station 100. These errors may be used to trigger various actions including halting a transfer in progress, updating or rescheduling of some portion of a transfer, or some combination thereof.

Figure 2B:
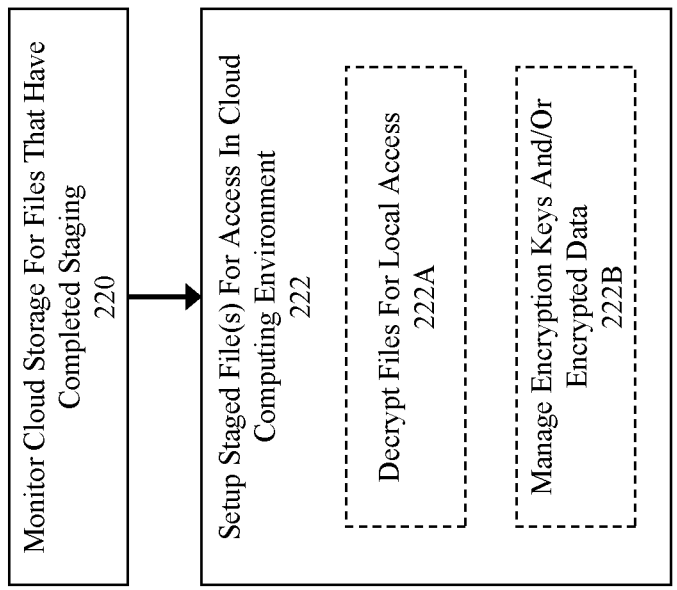

FIGS. 2A-2B illustrates a flow for orchestrating uploads of very large design files to selected cloud providers in a multi-cloud arrangement according to some embodiments.

FIG. 2A illustrates a flow for orchestrating the upload of very large design files to selected cloud providers in a multi-cloud arrangement according to some embodiments. Generally, the process is triggered when a data transfer request is received, and includes selection of a cloud provider corresponding to the data transfer request, and orchestrating a data transfer between a corresponding source and destination.

The process starts at 202 where a data transfer request is received. For example, a request is received that identifies a design (or design file), a cloud provider (e.g. Amazon AWS), and an action (e.g. a copy operation). In some embodiments the requests can include additional data, such as whether a design file should be encrypted using an encryption key known only to the client and/or a function to be completed on the design file at the cloud computing environment.

Based on the information in the data transfer request a cloud provider interface layer is selected at 204. For instance, a cloud provider interface layer could be identified based on a target address in the request, a preconfigured default provider, a cloud provider that was previously specified for the design or design file.

At 206, data transfer between the client-side device and a corresponding cloud computing environment is orchestrated. This will be discussed further below. However, briefly the orchestration may include preprocessing, such as encryptions and design file splitting, sequencing and execution of multiple commands to effectuate the transfer, and monitoring and feedback activities to control and verify the flow of data.

FIG. 2B illustrates a flow for orchestrating the receipt of uploaded design files at a selected cloud provider in a multi-cloud arrangement according to some embodiments. Generally, this includes monitoring public cloud storage for design files that should be moved into the production/verification area and, in some cases, operations in order to prepare the data for processing in the cloud computing environment.

At 220, a monitor process is executed, where cloud storage is monitored for design files or design file portions that are ready to be moved into the computing environment. For example, a specific location may be associated with the user, where design files in that area that are complete are stored, and from which the monitoring process triggers a process to move those design files into a production/verification area. Alternatively, cloud storage processes could be used, or configured to be used, to provide notification to the monitoring process, where the monitoring process analyzes any notifications to determine if any actions should be taken—e.g. triggering design file movement, a message confirming receipt, a verification process, or any combination thereof.

At 222, design files or design file pieces in the staging area are setup for access in the cloud computing environment. For instance, the design files are moved into storage within the computing environment, linked to the computing environment (e.g. via a pointer or another access mechanism), and computing environment components (e.g. virtual machines) are given access to execute one or more processes against those design files. For example, a design file may be moved into the computing environment and a process might be triggered that corresponds to action identified in the original data transfer request. In some embodiments, the setup process of 222 includes decrypting design files for local access at 222A (e.g. using the private key discussed above known only to the client) and/or management of encryption keys and/or encrypted data at 222B (such as maintaining encryption keys for access to encrypted design files or for re-encrypting decrypted data using the same encryption key originally provided with the data).

Figure 3:
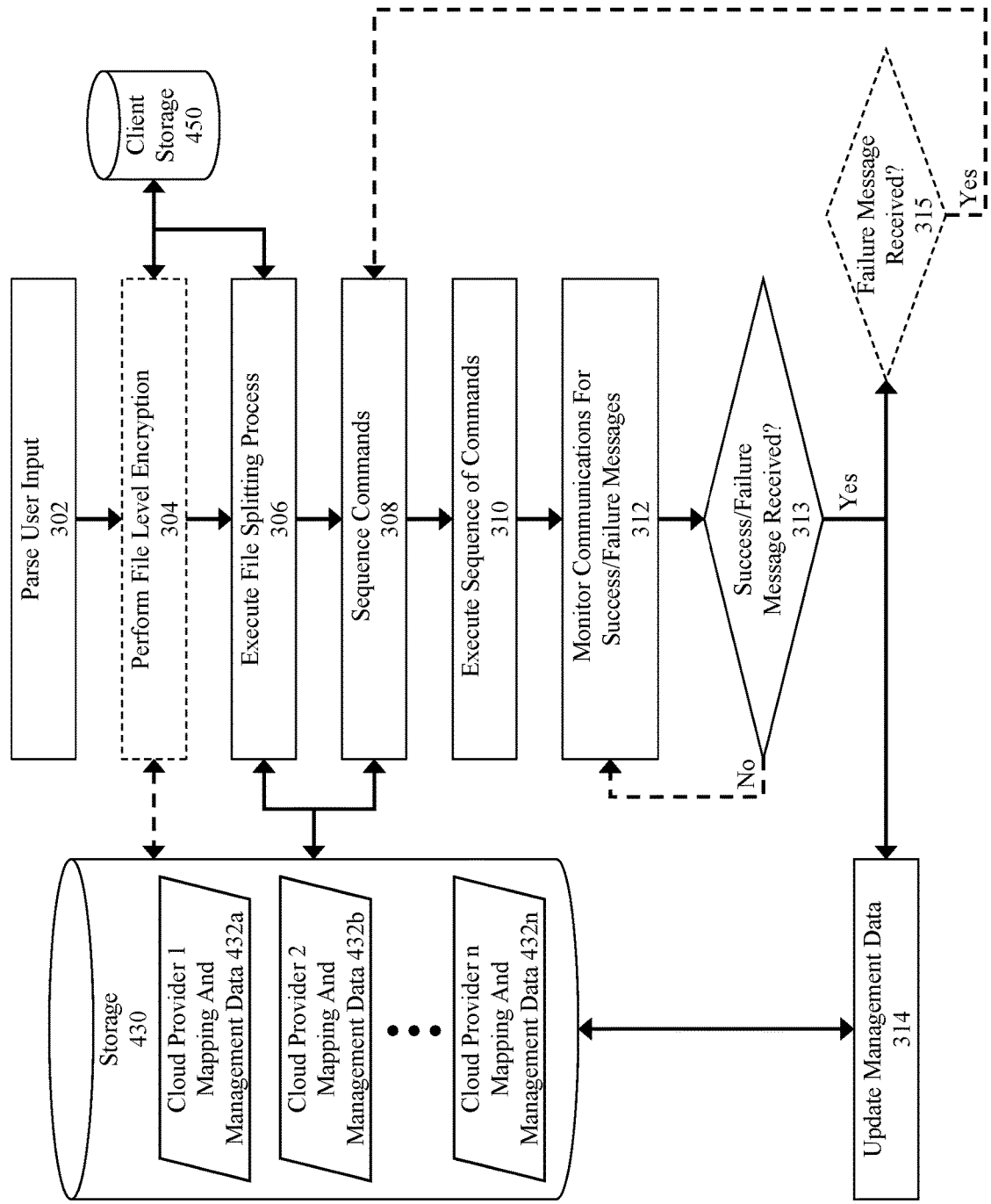
FIG. 3 illustrates a more detailed flow for the orchestration of data transfer a client-side device and a corresponding cloud computing environment as in 206 illustrated in FIG. 2A according to some embodiments.

FIG. 3 illustrates a more detailed flow for the orchestration of data transfer a client-side device and a corresponding cloud computing environment as in 206 illustrated in FIG. 2A according to some embodiments. Generally, the flow includes multiple steps such as design file encryption, design file splitting, sequencing, execution, monitoring, and various management activities.

The process starts at 302 where a user input is parsed. For example, the user input might identify a design (or design file), a cloud provider (e.g. Microsoft Azure), and an action (e.g. a transfer operation). In some embodiments the requests can include additional data, such as whether a design file should be encrypted using an encryption key known only to the client and/or a function to be completed on the design file at the cloud computing environment. Regardless of what exactly is included in the user input that is being parsed, the parsing process extracts the relevant information into different parameters that will be used later in the approach illustrated herein. In some embodiments, these parameters may be stored in a stored in a storage device area 430 or in mapping and management data of a cloud provider corresponding to an identified endpoint (e.g. 432a-n). In some embodiments, the parameters from parsing the user input are passed directly to a design file level encryption process 304.

The design file level encryption process, 304, will depend on one or more parameters from the parsed user input and/or from some cloud provider mapping and management data (432*a-n*). The design file level encryption process operates on the entire design file to generate a single encrypted design file—e.g. from client storage 450. In some embodiments, each design file is encrypted with a new encryption key to increase security. In some embodiments, each design file to be transmitted to each cloud design file is encrypted with a single key for use with each cloud provider. In some embodiments, the design file level encryption key is not provided to the cloud provider. The storage 430 or an area corresponding to the cloud provider is used to maintain a registry of design file identifiers and corresponding encryption keys (e.g. mapping and management data 431*a-n*). In some embodiments, the encrypted version of the design file is stored in the client storage 450. However, in some embodiments, design file level encryption is optional and can be controlled by a user, administrator, or client.

At 306 a design file splitting process is executed. Generally, the design file splitting process identifies/creates/maintains a plurality of subsets of a design file for separate transmission to a cloud provider, and in some embodiments for reconstruction at a receiving cloud provider. Additionally, the splitting process may be triggered when one or more conditions are met, such as a maximum file size or threshold number of failed transfer requests. The design file splitting process generally includes determining a splitting size target or target size range. The target size or target size range might comprise a default value, a user configured value, or a value based on past transfer activity. For instance, past transfer information might be collected regarding transfer failure rates for different size design files and machine learning or a formula might be used in order to select an optimal target size or target size range for design file parts. In some embodiments, the design file parts are separated out into different pieces of data having their own metadata. In some embodiments, the design file splitting process generates a set of metadata that references different portions of the design file (encrypted or otherwise), where the metadata is stored in the corresponding cloud provider mapping and management data (e.g. any of 432*a-n*).

At 308, a sequence of commands is generated to implement the action identified by parsing the user input. For instance, if the action is to put the design file identified at the target location, then the sequencing process determines the number and order the portions of the original design file to be transmitted. Additionally, the sequencing process looks up a mapping in the corresponding cloud provider mapping and management data to map the action identified in the user input parsing process to one or more commands for the specific provider identified by the target location. For example, an action comprising uploading a design file that is to be split into a number of pieces. The sequencer might identify a first command to initiate authentication procedures with the cloud provider, and to initiate data transfer of a multipart design file, where each design file portion is part of another transfer. Additionally, as will be discussed further, the sequencing process may be dynamic in that after an initial sequence is generated, periodic or trigger based analysis may be performed to verify success/failure of individual commands in the sequence including rescheduling and/or updating the schedule to retry portions that are reported as failed (e.g. in corresponding mapping and management data).

Once the sequence of commands is generated, the sequence of commands are executed in turn at 308. This process is additionally, managed by monitoring communications for success/failure messages at 312, where if it is determined that a success of failure message is received at 313, then management data is updated corresponding to that success or failure at 314. In some embodiments, if a failure message is received, as determined at 315, a notification may be provided, to the sequencing process 308, of the failure and may be used to trigger a dynamic adjustment to the schedule. For example, the dynamic adjustment might comprise inserting a corresponding command into the sequence of commands. Additionally, any retry control may be subject to a threshold number of attempts, where if the threshold number of attempts have already been made an error may be generated and provided to the electronic design system 110 indicating the failure and any relevant data.

Figure 4:
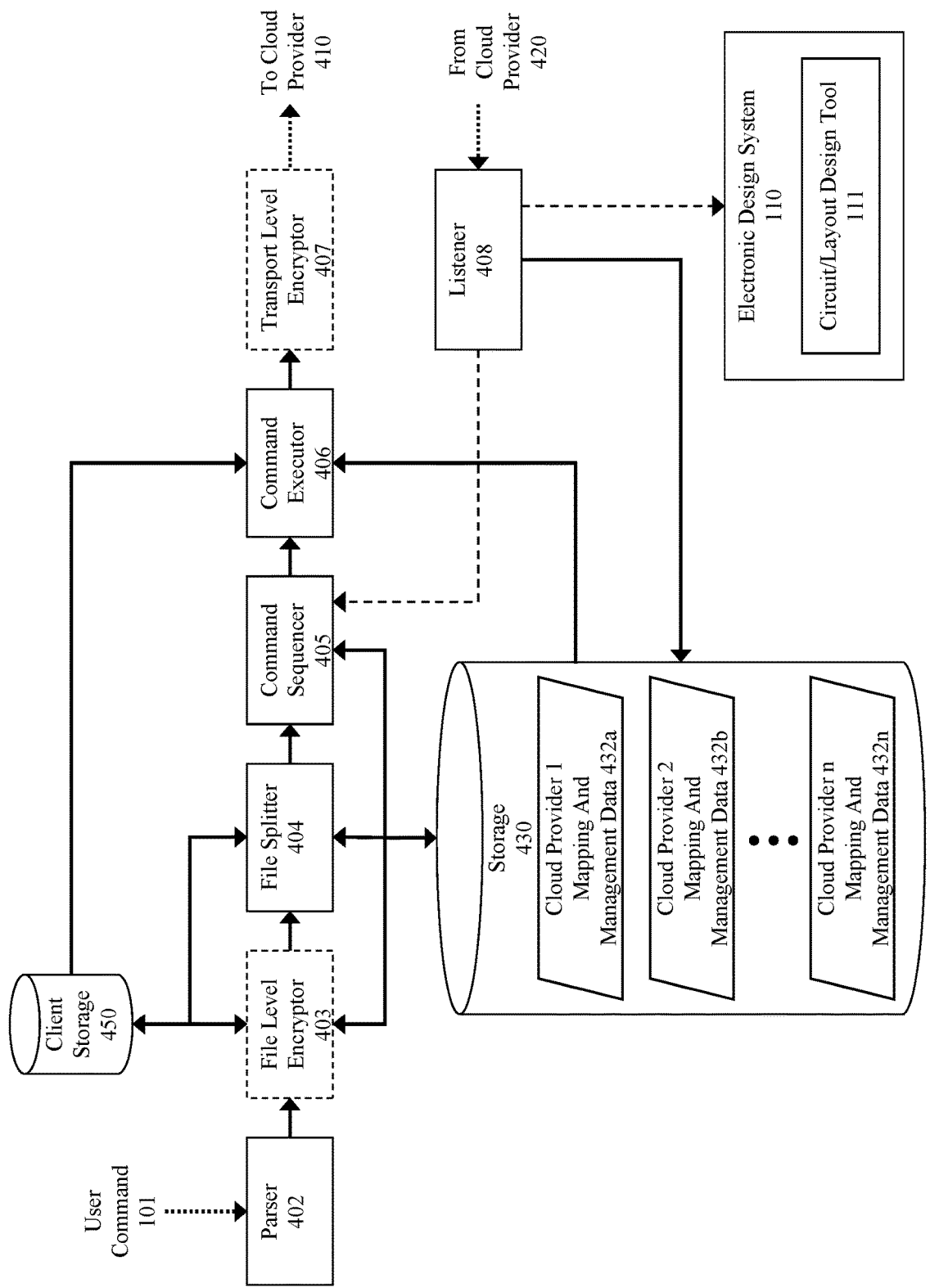
FIG. 4 illustrates an architecture for the orchestration of data transfer between a client-side device and a corresponding cloud computing environment as in FIG. 3 according to some embodiments.

FIG. 4 illustrates an architecture for the orchestration of data transfer between a client-side device and a corresponding cloud computing environment as in FIG. 3 according to some embodiments. Specifically, whereas FIG. 3 is directed towards a flow, FIG. 4 is directed towards modules that implement the processes of FIG. 3. Additionally, an illustrative example will be provided below in regard to FIGS. 5A-5G.

The parser 402 receives the user command 101 and parses the data as discussed above. For instance, the parser 402 identifies a design file ID, an action, and a target location based on predefined locations in the request, and/or one or more tags (such as extensible markup language—XML—or JavaScript Object Notation—JSON tags).

The information from the parser is used by the file level encryptor 403 at least to manage and/or select encryption keys and to manage design file encryption. For example, the target location is used by the file level encryptor 403 to identify the corresponding cloud provider from cloud providers 432*a-n* in storage 430. Once identified the file level encryptor may retrieve an encryption specification (e.g. whether to encrypt the design file(s)) and an encryption key if design files are to be encrypted. In the event that the encryption specification specifies that the design file(s) should be encrypted the file level encryptor will encrypt a design file stored in the client storage 450.

The design file splitter 404, performs one or more actions in order to define/divide the design file, whether encrypted or otherwise, into a number of portions. In some embodiments, a default target size or target size range is used for all design file splitting, or where no other specification is provided the target size or target size range is used to determine the number of parts (e.g. based on a maximum portion size). In some embodiments, a splitting parameter is retrieved from corresponding cloud provider mapping and management data (e.g. 432*a*) to determine how a design file should be split. Regardless, the design file splitter 404 will either generate multiple split design file portions or will define multiple split design file portions in place (e.g. by specifying address ranges/offsets corresponding to different portions and generating some additional metadata). At least some of the data generated by the design file splitter 404 will be stored in the storage 430 such as in a corresponding management data area (e.g. 432*a*).

A command sequencer 405, identifies the relevant data, the target location, and the action, and maps them to a sequence of commands. The command sequencer 405 is associated with a plurality of action to command mappings. Specifically, each supported cloud provider is associated with a set of action to command mappings. These mappings are first identified based on the selected cloud service provider, and then processed to identify a sequence of commands to generate. For example, first cloud provider mappings are identified based on the selected cloud provider. Subsequently, a sequence of commands are identified in the first cloud provider mappings for performing the action (e.g. authentication, transfer description exchange, data transfer of each subset, transfer success verification). In some embodiments, the sequence of commands are subject to one or more status/condition modifiers or rules—e.g. the authentication commands are predicated on a particular authentication status, the number of data transfers are predicated on the number of parts to be transferred, etc. In some embodiments, the mappings are also associated with a set of ruled for handling responses from a corresponding cloud provider, such as how to handle failed and/or successful data transfers.

The command executor 406 receives/retrieves the sequence of commands and manages the execution of those commands. For example, the command executor 406 executes the commands in the sequence of commands. In some embodiments, the commands (and communications generated as a result of those commands) are encrypted using a transport level encryptor 407 such as by using a Hypertext Transfer Protocol Secure (HTTPS) encryption flow to enable secure communications over a communications channel to the corresponding cloud provider at 410. Under the covers HTTPS uses Transport Layer Security (TLS), or, its predecessor, Secure Sockets Layer (SSL).

In some embodiments, a listener 408 monitors the communications channel for requests and responses from a cloud provider at 420. For instance, a cloud provider might provide a first response acknowledging receipt of a first portion of the design file, and a second response indicating a failed transfer with regard to a second portion of the design file (e.g. corrupted data or a transfer timeout). In both cases, the listener might update corresponding management data in the corresponding cloud provide mapping and management data (e.g. 432a) to indicate the success or failure. Additionally, in the event of a failure, the listener 408 might also indicate directly to the command sequencer 405 that a particular design file portion or communication transfer failed. In such an event, the command sequencer 405 might reschedule a reattempt in the form of an additional scheduled command, possible subject to an attempt/iteration limit. In the event that an iteration limit has been reached the command sequencer or the listener 408 might transmit a failure message to the electronic design system 110 or the circuit/layout design tool 111. Additionally, in some embodiments, the listener might be used to exchange one or more communications with the electronic design system from a circuit verification and processing tool (e.g. 162a-n) at the cloud provider computing environment (e.g. 161, 164, 167). For instance, if an action specified by a user is a design file transfer and overlapping cloud computing environment verification processing, the cloud provider computing environment might identify an error in the design while portions of the design are still being transferred. In such an event, the cloud computing environment might trigger an error notification and transmit data representing the error to the multi-cloud orchestrator 130, where the listener 408 receives the error and passes the notification on to the electron design system 110 and/or the circuit/layout design tool 111. In some embodiments, a design change is made in response to the error notification, the design file is then updated accordingly, and one or more new design file portions are defined such that only the portion(s) of the design containing the modified parts needs to be retransmitted to the could provider, before sequencing/resequencing the transfer of the modified portion(s). In this way, a design may be verified, at least in part, even while it is being transferred, and corrections can be made without requiring the complete restart of the transfer.

FIGS. 5A-5G illustrate an example sequence of operations in relation to the architecture for the orchestration of data transfer between a client-side device and a corresponding cloud computing environment as in FIG. 4 according to some embodiments. The FIGS. 5A-5G include the same elements as FIG. 4 and thus, to the extent that these elements are already described and to the extent that those descriptions do not contradict those in regard to FIGS. 5A-5G, the prior description applies and will not be repeated.

Figure 5A:
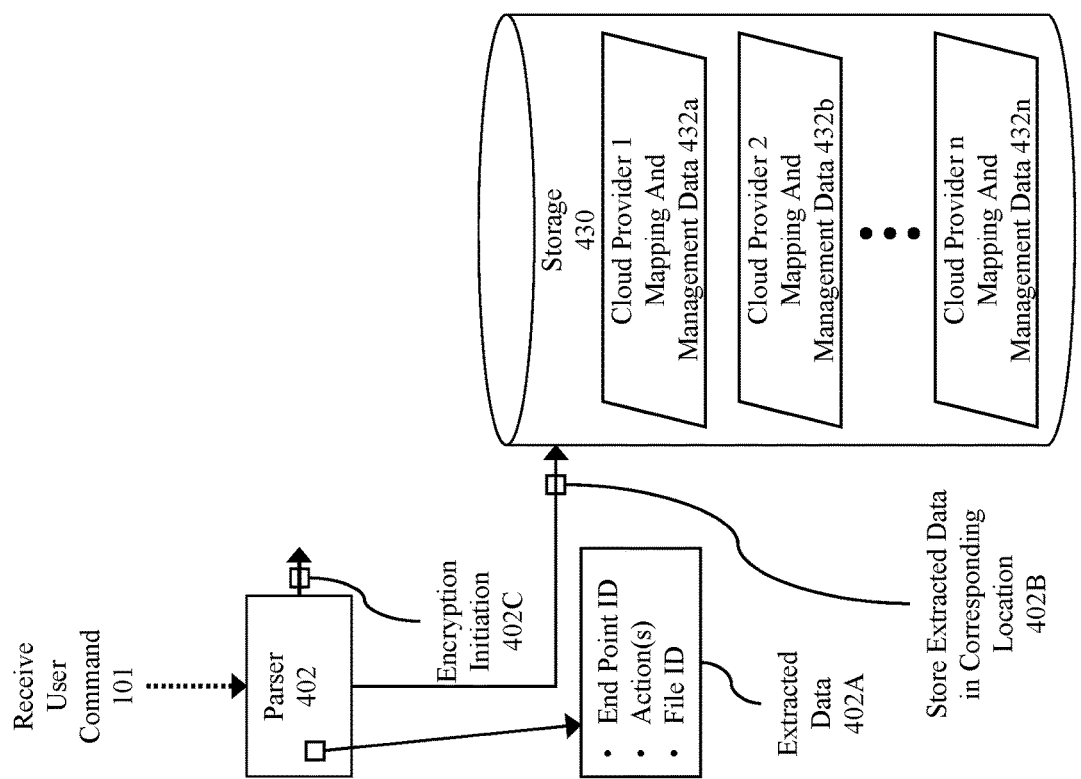
FIGS. 5A-5G illustrate an example sequence of operations in relation to the architecture for the orchestration of data transfer between a client-side device and a corresponding cloud computing environment as in FIG. 4 according to some embodiments.

FIG. 5A includes the parser 402 and the storage 430, including cloud provider mapping and management data 432a-n. The parser 402 receives a user command 101 (such as a user command as discussed above) and parses the user command. Parsing the user command generates some extracted data 402A (e.g. end point ID, Action(s), Design file ID) from the user command. Additionally, the parser stores the extracted data in a corresponding location in the storage 430 at 402B. For instance, the parse data is stored in a queue of pending user commands to be handled somewhere within 430 that is not necessarily associated with a specific cloud provider. Finally, at 402C encryption processing is initiated after the parsing is completed.

Figure 5B:
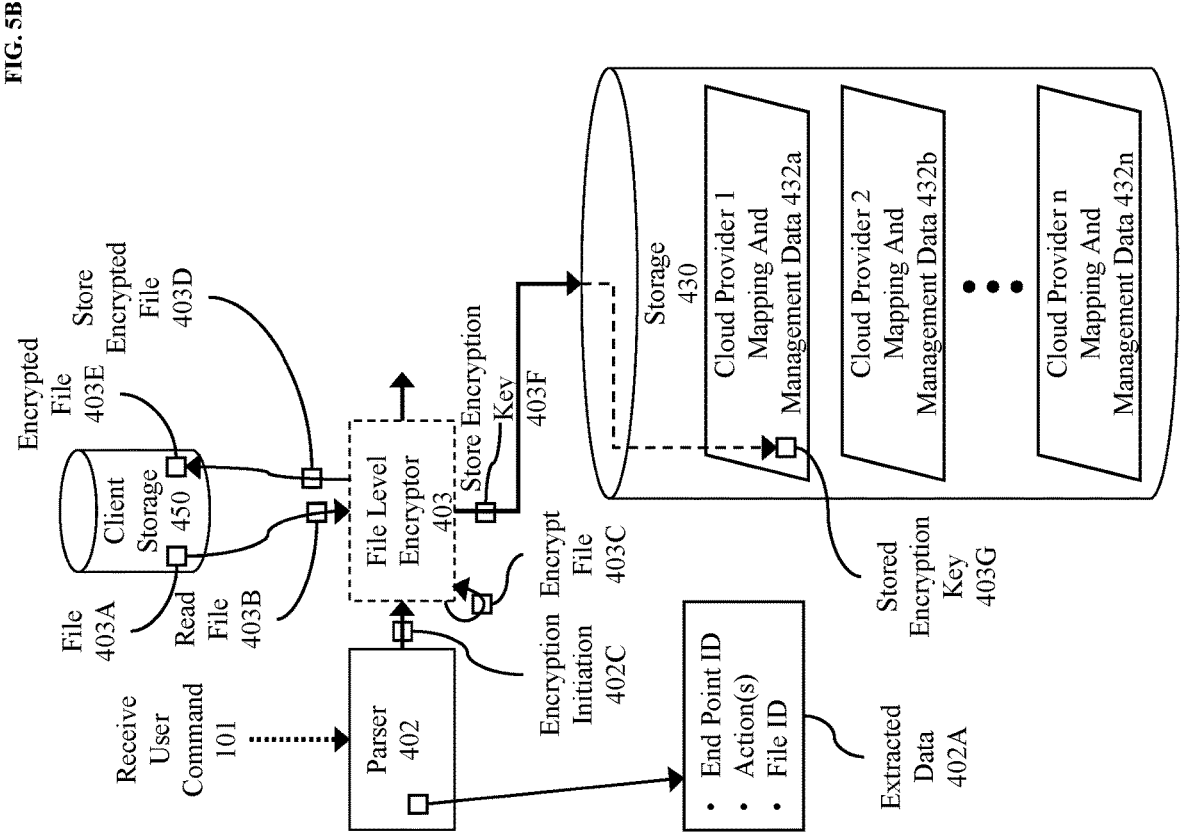

FIG. 5B adds the file level encryptor 403 and the client storage 450. As illustrated, the encryption initiation 402C triggers the file level encryptor to begin processing at 403. As illustrated a design may be represented by a design file 403A that is stored in the client storage 450. The design file 403A is read by the file level encryptor. The file level encryptor then encrypts the design file at 403C. As illustrated here, the file level encryptor already has a corresponding encryption key (e.g. client default key). Once or as the design file is being encrypted, the design file is stored at 403D into an encrypted design file 403E into client storage 450. Additionally, the encryption key is stored at 403F in the corresponding management data for the cloud provider as the stored encryption key 403G. Additionally, the stored encryption key is associated with the design file possible for future decryption or updated of design file parts.

Figure 5C:
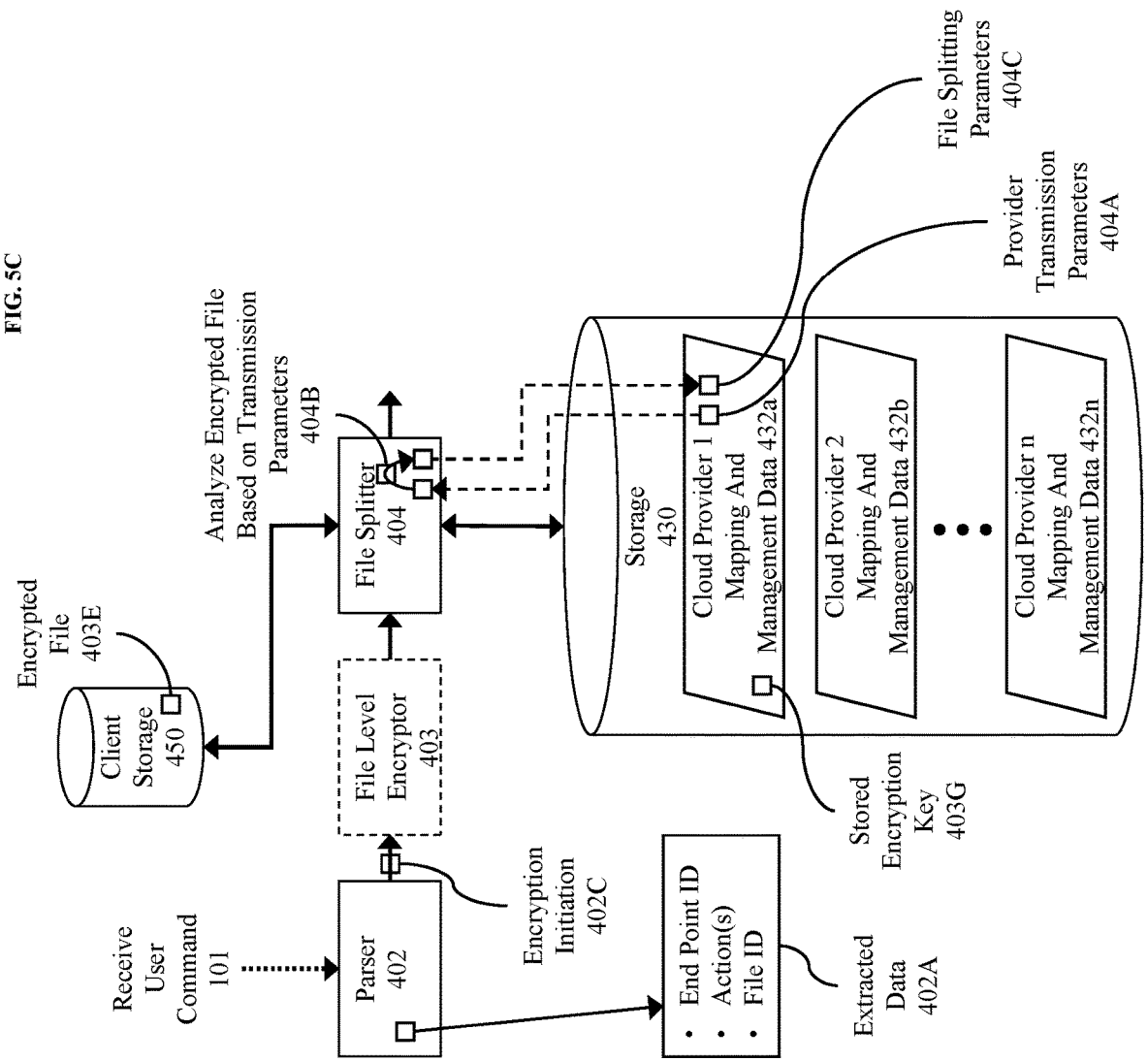

FIG. 5C adds the design file splitter 404. The design file splitter reads cloud provider transmission parameters at 404A and analyzes the encrypted design file based on those parameters at 404B. Based on the analysis, the file splitter stores filing splitting parameters 404C that specify how the encrypted design file is to be divided into parts by defining portions of the design file that correspond to each encrypted portion.

Figure 5D:
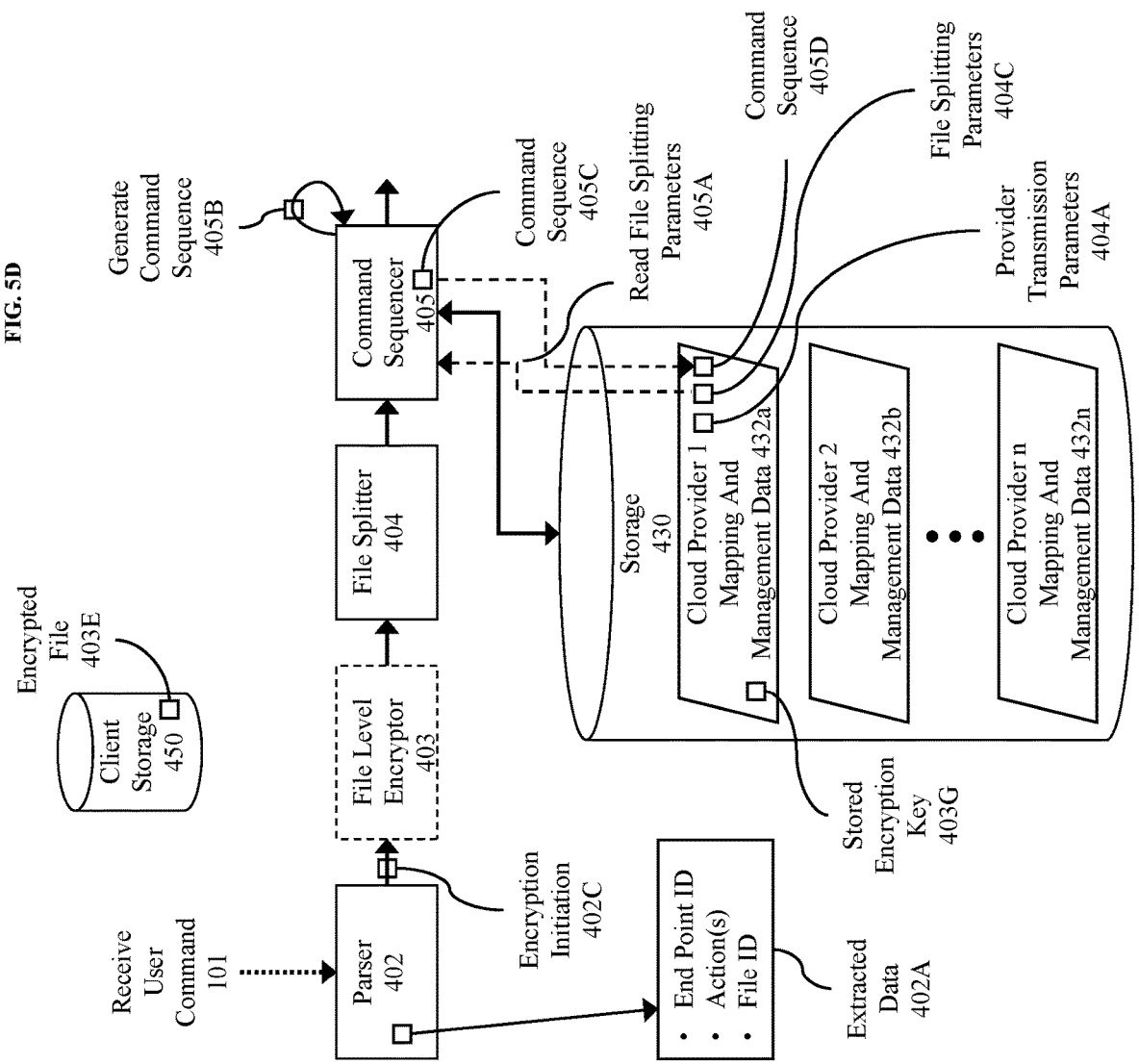

FIG. 5D adds the command splitter 405. The command splitter reads the design file splitting parameters at 405A. At 405B the command sequencer generates a command sequence 405C to perform the action(s) based on the design file splitter parameters 404C and based on the cloud provider mapping data of 432a. In some embodiments, the command sequence 405C is storage in the cloud provider mapping and management data 432a as command sequence 405D.

Figure 5E:
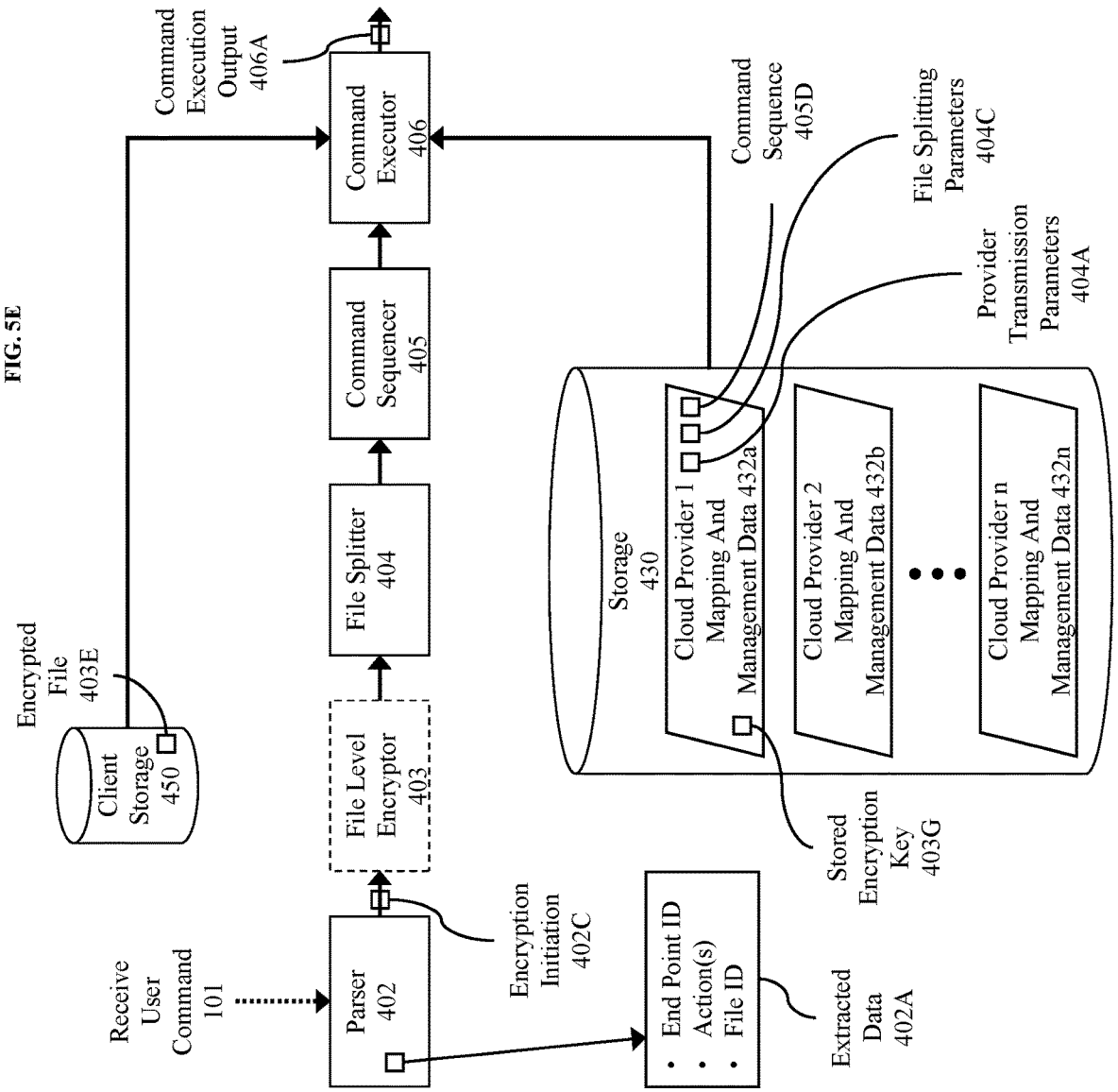

FIG. 5E adds the commend executor 406. The command executor reads the command sequence 405D and the encrypted design file 403E to generate a command execution output 406A. The command execution output 406A comprises the output of executing each command. For instance, one command comprises design file portion identification information, the corresponding data, and a corresponding action (e.g. transfer to cloud storage location).

Figure 5F:
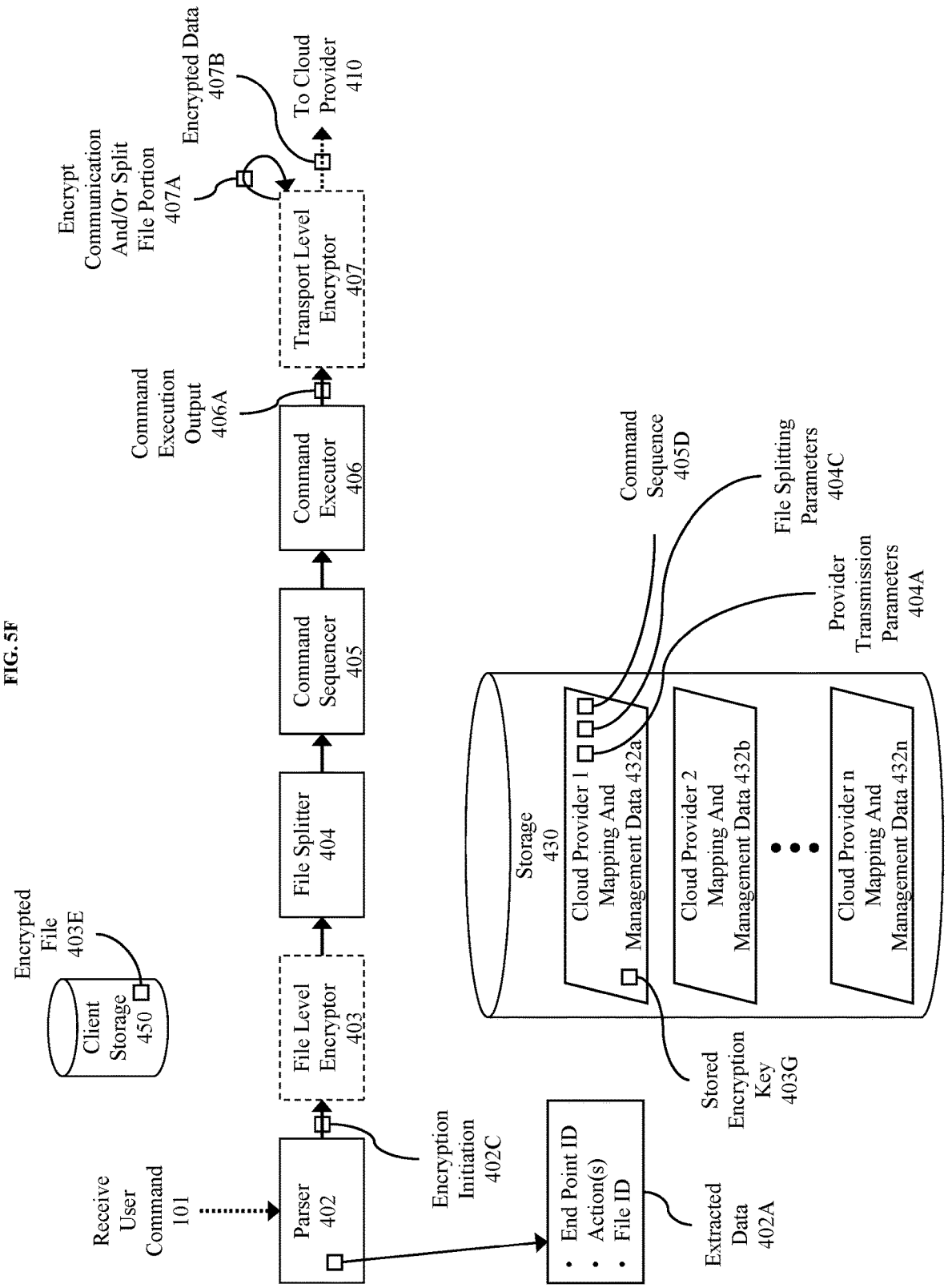

FIG. 5F adds the transport layer encryptor 407. The transport layer encryptor 407 encrypts the output of the command execution output 406A prior to transmission over a communications medium (e.g. network/internet) at 407A using an appropriate encryption mechanism such as an HTTPS communications layer to produce encrypted data 407B that is sent to the cloud provider 410.

Figure 5G:
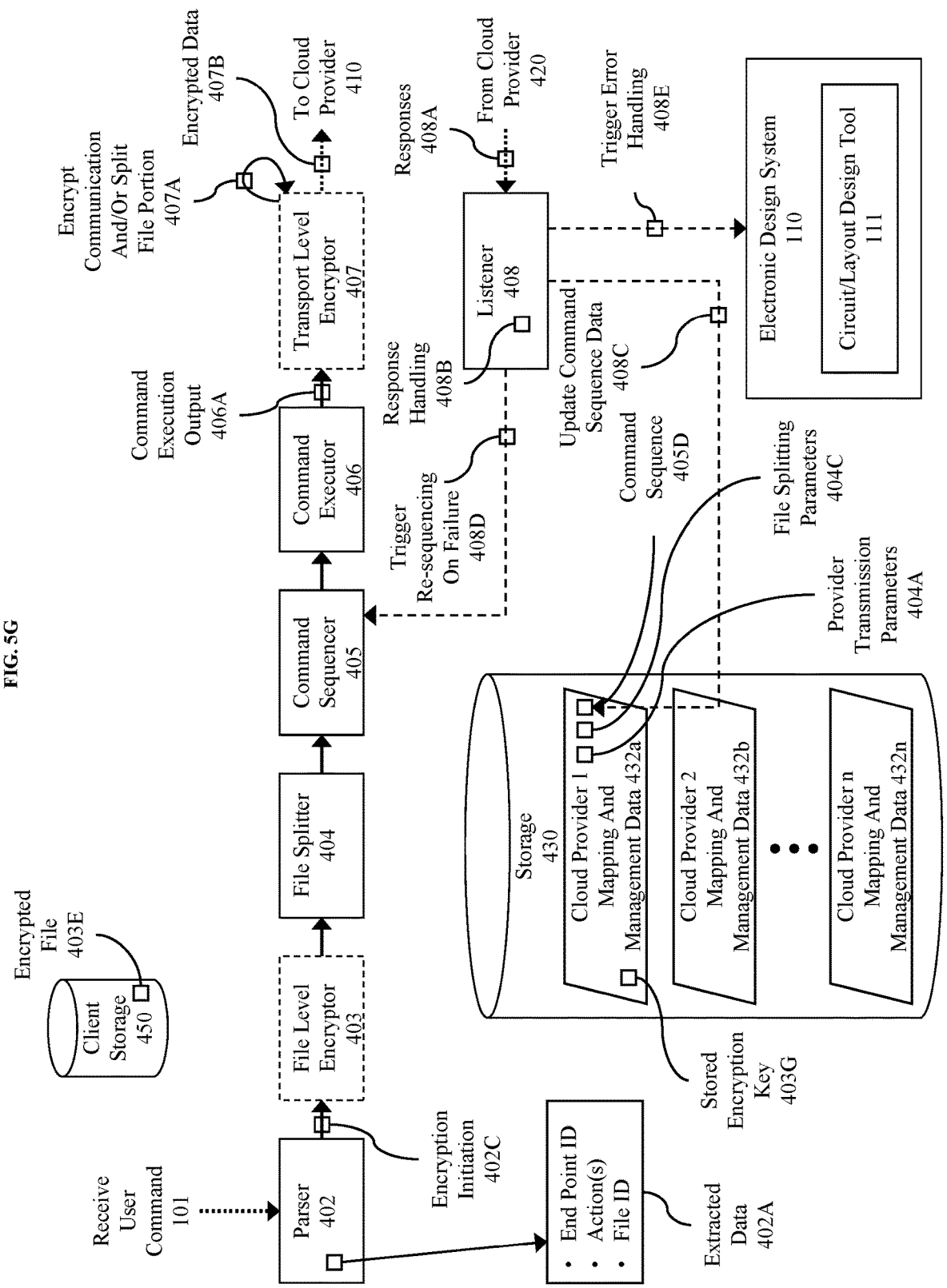

FIG. 5G adds the listener 408. The listener receives responses 408A from a cloud provider at 420. The listener executes an internal process at 408B to determine how to handle a received response. For instance, at 408C the process might update command sequence data to indicated that corresponding portions of a design have completed or failed to transfer. Additionally, in the event of a failure, the listener 408 may trigger the re-sequencing of transmission of a corresponding portion at 408D. In one embodiment, the listener 408 triggers error handling at 408E in an electronic design system 110 and/or a circuit/layout design tool. For instance, in the event that the cloud provider is executing a verification process and identifies a design error (e.g. a design rule check violation), the cloud provider interface layer (e.g. 151, 154, 157) sends a response to the multi-cloud orchestration system 130 which the listener routes to a notification mechanism (e.g. within the electronic design system) of the design error. This notification may be processed as discussed above, which may include updating the design file portions and the sequence of commands.

Therefore, what has been described is an improved approach for orchestrating uploads of very large design files to selected cloud providers in a multi-cloud arrangement.

The approach increases productivity by leveraging external processing resources from cloud service providers using a multi-cloud orchestrator that is specifically tailored to electronic design system environments and uses. In particular, the approach provides increase security via full file encryption without requiring that the encryption key be provided to a cloud service provider and provides file and transfer management processes to split design files into multiple subsets that can be restarted separately in the event of a failed transfer and often reused even where changes are made to a design file.

System Architecture Overview

Figure 6:
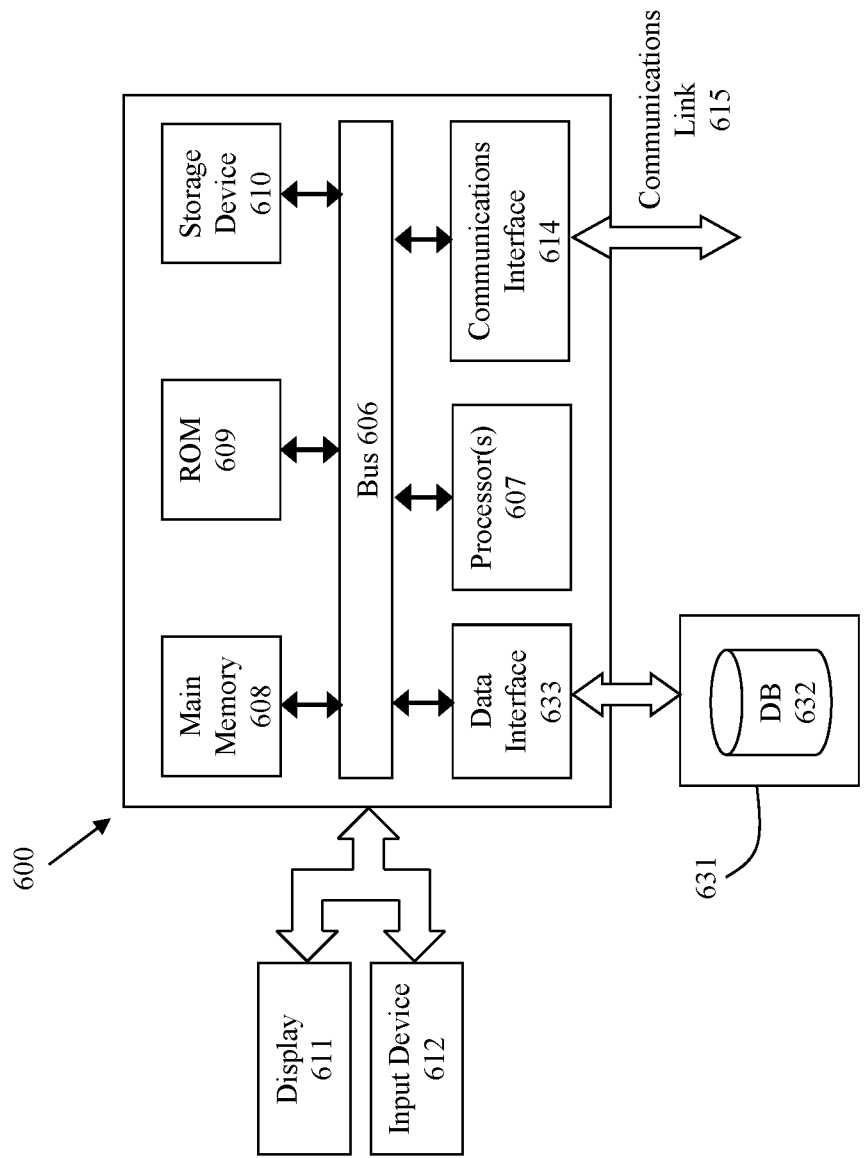
FIG. 6 shows an architecture of an example computing system with which the invention may be implemented.

FIG. 6 shows an architecture of an example computing system with which the invention may be implemented. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. Computer system 600 may communicate through a data interface 633 to a database 632 on an external storage device 631.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   receiving, from a client device, a request to transfer a design file in client storage associated with an electronic design system to a corresponding cloud provider from a plurality of cloud providers;
   selecting a cloud provider corresponding to the request, the cloud provider being selected from the plurality of cloud providers based on one or more parameters; and
   orchestrating the request to transfer the design file from the client storage to a cloud computing environment provided by the selected cloud provider based on at least a set of cloud provider mapping data that maps the request to one or more commands to form a sequence of commands, wherein the request specifies an action to be performed on at least a portion of the design file after the portion of the design file is transferred to the cloud computing environment.

2. The method of claim 1, wherein the request is parsed to identify an end point identifier, the action, and a design file identifier.

3. The method of claim 1, wherein selecting the cloud provider corresponding to the request comprises selecting the cloud provided from the plurality of cloud providers based on an end point identifier.

4. The method of claim 1, wherein orchestrating the request from the client storage to the cloud computing environment provided comprises a file level encryption process, a file splitting process, a command sequencing process, an execution process, and a monitoring process.

5. The method of claim 4, wherein the file level encryption process comprises identifying an encryption key based on at least the selected cloud provider and encrypting the file prior to executing the file splitting process.

6. The method of claim 4, wherein the file splitting process comprises determining a file splitting size target or file splitting target size range, and the size target or the file splitting target size range being determined based on a default value, a user configured value, or a value based on past transfer activity.

7. The method of claim 4, wherein the execution process comprises execution of the sequence of commands generated to perform the requested transfer of the design file.

8. The method of claim 4, wherein the monitoring process comprises processing one or more communications from the selected cloud provider to identify one or more success or failure messages, and receipt of a failure message triggers a rescheduling action in the command sequencing process subject to an attempt limit.

9. The method of claim 4, wherein the monitoring process comprises processing one or more communications from the selected cloud provider to identify a design rule check violation notification, and to provide the design rule check violation notification to the electronic design system.

10. A non-transitory computer readable medium having stored thereon a sequence of instructions which, when executed by a processor performs a set of acts, the set of acts comprising:
    detecting a pending request from a client device to transfer a design file in a client storage device associated with an electronic design system to a corresponding cloud provider from a plurality of cloud providers;
    identifying a cloud provider from the plurality of cloud providers based on one or more parameters, the cloud provider corresponding to the pending request; and
    orchestrating the pending request to transfer the design file from the client storage to a cloud computing environment provided by the identified cloud provider based on at least a set of cloud provider mapping data that maps the request to one or more commands to form a sequence of commands, wherein the request specifies an action to be performed on at least a portion of the design file after the portion of the design file is transferred to the cloud computing environment.

11. The computer readable medium of claim 10, wherein the request is parsed to identify an end point identifier, the action, and a design file identifier.

12. The computer readable medium of claim 10, wherein identifying a cloud provider comprises selecting the cloud provided from the plurality of cloud providers based on an end point identifier.

13. The computer readable medium of claim 10, wherein orchestrating the pending request from the client storage to the cloud computing environment provided comprises a file level encryption process, a file splitting process, a command sequencing process, an execution process, and a monitoring process.

14. The computer readable medium of claim 13, wherein the file level encryption process comprises identifying an encryption key based on at least the identified cloud provider and encrypting the design file prior to executing the file splitting process.

15. The computer readable medium of claim 13, wherein the file splitting process comprises determining a file splitting size target or file splitting target size range, and the size target or the file splitting target size range being determined based on a default value, a user configured value, or a value based on past transfer activity.

16. The computer readable medium of claim 13, wherein the execution process comprises execution of the sequence of commands generated to perform the pending request to transfer the design file.

17. The computer readable medium of claim 13, wherein the monitoring process comprises processing one or more communications from the identified cloud provider to identify one or more success or failure messages, and receipt of a failure message triggers a rescheduling action in the command sequencing process subject to an attempt limit.

18. A system, comprising:
    memory comprising a sequence of instructions; and
    a processor that executes the sequence of instructions to perform a set of acts comprising:
        receiving, from a client device, a request to transfer a design file in client storage associated with an electronic design system to a corresponding cloud provider from a plurality of cloud providers;
        selecting a cloud provider corresponding to the request, the cloud provider being selected from the plurality of cloud providers based on one or more parameters; and
        orchestrating the request to transfer the design file from the client storage to a cloud computing provider based on at least a set of cloud provider mapping data that maps the request to one or more commands to form a sequence of commands, the transfer being to the cloud computing environment provided by the cloud provider, wherein the request specifies an action to be performed on at least a portion of the design file after the portion of the design file is transferred to the cloud computing environment.

19. The system of claim 18, wherein the request is parsed to identify an end point identifier, the action, and a design file identifier.

20. The system of claim 18, wherein selecting the cloud provider corresponding to the request comprises selecting the cloud provided from the plurality of cloud providers based on an end point identifier.

* * * * *